(12) United States Patent
Cha

(10) Patent No.: US 7,411,629 B2
(45) Date of Patent: Aug. 12, 2008

(54) METHOD AND APPARATUS FOR CORRECTING FREQUENCY CHARACTERISTICS OF CARRIER CHROMINANCE SIGNAL

(75) Inventor: Tae-hwan Cha, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 578 days.

(21) Appl. No.: 11/156,529

(22) Filed: Jun. 21, 2005

(65) Prior Publication Data

US 2005/0280710 A1    Dec. 22, 2005

(30) Foreign Application Priority Data

Jun. 21, 2004    (KR) .................... 10-2004-0046250

(51) Int. Cl.
 *H04N 9/64* (2006.01)
 *H04N 5/21* (2006.01)
(52) U.S. Cl. ...................... 348/711; 348/624
(58) Field of Classification Search ............ 348/624, 348/711, 642, 645, 478, 710, 647; 386/10
See application file for complete search history.

(56) References Cited

U.S. PATENT DOCUMENTS 4,237,476 A * 12/1980 Hanma et al. ............. 348/711
4,825,299 A * 4/1989 Okada et al. .............. 386/16
4,930,003 A * 5/1990 Hosoya ..................... 348/505
5,815,281 A * 9/1998 Yasumura et al. ......... 358/296

FOREIGN PATENT DOCUMENTS

| JP | 07-030881 A | 1/1995 |
| JP | 10-191148 A | 7/1998 |
| KR | 93-23992 A | 12/1993 |
| KR | 97-60861 A | 8/1997 |
| KR | 2000-0041175 A | 7/2000 |

* cited by examiner

*Primary Examiner*—Victor R Kostak
(74) *Attorney, Agent, or Firm*—Sughrue Mion, PLLC

(57) ABSTRACT

A method and an apparatus are provided for correcting the frequency characteristics of a carrier chrominance signal, which, by use of the correcting signal for the frequency characteristic involved in a vertical blanking interval, determine whether the frequency characteristics of the carrier chrominance signal are distorted and correct the frequency characteristics. A band pass filter is used which determines a degree of the frequency characteristic distortion of the carrier chrominance signal band from the correcting signal for the frequency characteristic, and has a gain in accordance with the determined result. If the frequency characteristic of the carrier chrominance signal involved in the input composite video signal is distorted by the frequency characteristics and so on of the analog broadcasting radio channel and the broadcasting receiver, the distortion is corrected whereby a stable reproduction of the color signal is possible irrespective of the broadcasting channels and the broadcasting receiver.

9 Claims, 4 Drawing Sheets

METHOD AND APPARATUS FOR CORRECTING FREQUENCY CHARACTERISTICS OF CARRIER CHROMINANCE SIGNAL

CROSS-REFERENCE TO RELATED APPLICATIONS

This application claims priority from Korean Patent Application No. 2004-46250, filed on Jun. 21, 2004, the entire content of which is incorporated herein by reference.

BACKGROUND OF THE INVENTION

1. Field of the Invention

Apparatuses and methods consistent with the present invention relate to correcting frequency characteristics of a carrier chrominance signal, which, by use of the multi burst signals involved in a vertical blanking interval, determine whether the frequency characteristics of the carrier chrominance signal are distorted and correct the frequency characteristics.

2. Description of the Related Art

A broadcasting receiver is required for reception of analog broadcasting including a National Television System Committee (NTSC) system, a Phase Alternation Line (PAL) system, and a Sequential Couleur Avec Memoire (SECAM) system. Since the recent launch of the digital broadcasting, a simulcast that broadcasts the same contents as those of a digital broadcast has continued in an analog manner in order to provide service for users who have an analog broadcasting receiver. Thus, it is true that a digital broadcasting receiver also has a receiving end for receiving analog broadcasts.

When an analog broadcasting channel is selected, a tuner receives the corresponding radio frequency and transforms it to a 45.75 MHz intermediate frequency video signal. The intermediate frequency video signal is demodulated at a video detector circuit into a composite video signal, called CVBS (color, video, burst, sync) signal, that the intermediate frequency video signal is separated therefrom. The composite video signal is input into a video decoder and thus decomposed into three primary color signals for practical color reproduction. Then, the decomposed video signal is displayed through a display unit such as CRT and so on.

The composite video signal is shaped in such a manner that a 3.58 MHz (accurately, 3.579545 MHz) color subcarrier is balance-modulated and sidebands thereof are combined to form a carrier chrominance signal, and the luminance signal is then combined thereto. However, the overlapping of the carrier chrominance signal to the luminance signal renders an amplitude of the carrier chrominance signal excessively enlarged, providing over modulation, so that it requires a compression of the amplitude. Thus, the carrier chrominance signal is compressed in its amplitude and is combined with the luminance signal.

A video decoder of the broadcasting receiver includes therein an analog-digital converter and a comb filter so as to receive an analog composite video signal that the luminance signal and the color signal are multiplexed and input thereto. An analog composite video signal is converted into a digital signal by the analog-digital converter, which is in turn decomposed into the luminance signal and the color signal by the comb filter. If frequency characteristics of the decomposed color signal are distorted, a certain correction is necessary.

FIGS. 1A to 1C are graphs illustrating the frequency characteristics of the composite video signal in order to explain a problem of the prior art.

A graph of FIG. 1A shows the frequency characteristics of the normally received composite video signal. The frequency component 101 of the luminance signal reaches up to 4.2 MHz, and the frequency component 103 of the color signal is interleaved into the luminance signal while being carried in the 3.58 MHz color subcarrier 105.

Such frequency characteristics of a composite video signal are distorted in accordance with broadcast channels or the type of the broadcasting receiver.

FIG. 1B shows the frequency characteristics of a composite video signal of FIG. 1A being distorted. The distortions may be caused by the frequency characteristics of the broadcast channels or the broadcasting receiver. Referring to a graph of FIG. 1B, one can understand that signals of high frequency band are mainly distorted. Practically, the signal distortion in a 4.2 MHz high frequency band indicates that the color signal is more distorted than the luminance signal.

Upon decomposing the input video signal with such frequency characteristics as shown in FIG. 1B into the color signal by use of the comb filter, a graph as shown in FIG. 1C appears.

FIG. 1C shows the distorted frequency characteristics of the color signal carried in the color subcarrier.

In order to correct the distortion of such frequency characteristics, the color signal from the comb filter is corrected with a constant fixed value using an active band pass filter. However, such correction irrespective of a degree of the distortion cannot be an accurate correction.

SUMMARY OF THE INVENTION

The present invention provides a method and an apparatus for correcting the frequency characteristics of a carrier chrominance signal, which, by use of the multi burst signals involved in a vertical blanking interval, determine whether the frequency characteristics of the carrier chrominance signal are distorted and adaptively correct the frequency characteristics.

According to an aspect of the present invention, there is provided an apparatus for correcting the frequency characteristics of the carrier chrominance signal, the apparatus comprising: a correcting section for correcting the frequency characteristics of the carrier chrominance signal decomposed from the composite video signal in which a correction signal is interleaved in a vertical blanking interval, using a compensating circuit with a certain gain; and a frequency characteristic detecting section for detecting the frequency characteristics from the correcting signal decomposed from the composite video signal so as to control the gain of the correcting section.

The correcting section may be a compensating circuit characterized by a transfer function in which the gain at color subcarrier of the carrier chrominance signal is 0 dB, and the certain gain is obtained at the highest frequency of the composite video signal.

The frequency characteristic detecting section may transfer to the correcting section a damp difference, obtained from the frequency characteristics of the correcting signal and adapted as the gain, between the highest frequency of the composite video signal and the color subcarrier component of the carrier chrominance signal.

The frequency characteristic detecting section may transfer to the correcting section the damp difference in dB unit value.

In accordance with another aspect of the present invention, there is provided a video decoder having the apparatus for correcting frequency characteristics of the carrier chrominance signal, which outputs a color signal through the correction of the frequency characteristic of the carrier chrominance signal decomposed from the composite video signal.

In accordance with another aspect of the present invention, there is provided a method for correcting the frequency characteristics of the carrier chrominance signal, the method comprising the steps of: detecting the frequency characteristics from a correcting signal decomposed from a composite video signal in which the correcting signal is interleaved in a vertical blanking interval; calculating a gain to be corrected from the detected frequency characteristics; and correcting the frequency characteristics of the carrier chrominance signal decomposed from the composite video signal, using a compensating circuit with the calculated gain.

The compensating circuit may be characterized by a transfer function in which the gain at color subcarrier of the carrier chrominance signal is 0 dB, and the certain gain is obtained at the highest frequency of the composite video signal.

In the calculating, the gain may be provided as a damp difference, obtained from the detected frequency characteristics, between the highest frequency of the composite video signal and the color subcarrier component of the carrier chrominance signal.

In the calculating, the gain by the damper difference may be calculated in dB unit value.

BRIEF DESCRIPTION OF THE DRAWINGS

The above and other aspects of the present invention will be more apparent by describing exemplary embodiments of the present invention with reference to the accompanying drawings, in which.

DETAILED DESCRIPTION OF THE EXEMPLARY EMBODIMENTS

Hereinafter, exemplary embodiments of the present invention will be described in detail with reference to the attached drawings.

Figure 2:
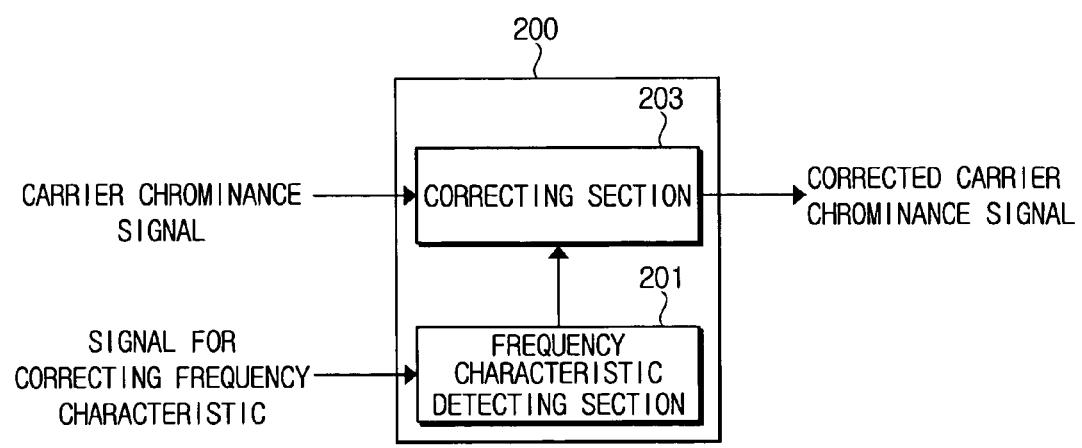
FIG. 2 is a block diagram of an apparatus for correcting the frequency characteristics of a carrier chrominance signal in accordance with an exemplary embodiment of the present invention.

FIG. 2 is a block diagram of an apparatus for correcting the frequency characteristics of a carrier chrominance signal in accordance with an exemplary embodiment of the present invention. The apparatus for correcting the frequency characteristics of a carrier chrominance signal in accordance with the present invention corrects the frequency characteristics of the carrier chrominance signal decomposed from the composite video signal in which a correcting signal is interleaved in a vertical blanking interval. Referring to FIG. 2, a correcting apparatus 200 includes a frequency characteristic detecting section 201 and a correcting section 203.

The frequency characteristic detecting section 201 detects the frequency characteristic of the composite video signal from the correcting signal for the frequency characteristic in the vertical blanking interval decomposed from the composite video signal and transfers the detected frequency characteristic to the correcting section 203, thereby allowing the correcting section 203 to correct the distorted frequency characteristic of the carrier chrominance signal which is input.

Generally, the composite video signal is converted into a digital signal through an analog-digital converter (not shown) and input. It is separated into the carrier chrominance signal and a luminance signal including in the vertical blanking interval the correcting signal for the frequency characteristic, and input into the apparatus for correcting frequency characteristic of the carrier chrominance signal of the exemplary embodiment of the present invention.

The signal for correcting the frequency characteristic means a vertical interval test signal (VITS) involved in the vertical blanking interval and which includes 2T-pulse, color bar, multi burst signal and so on. With the use of VITS, various characteristic quality of the received composite video signal can be monitored. Preferably, but not necessarily, the present invention uses the multi burst signal.

Figure 3A:
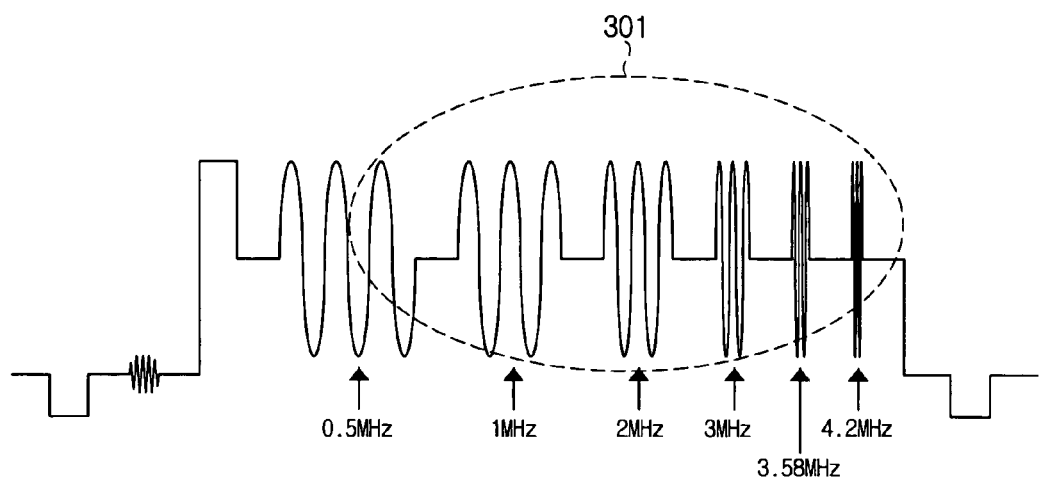
FIGS. 3A and 3B illustrate waveforms indicating a multi burst signal involved in a vertical blanking interval.
Figure 3B:
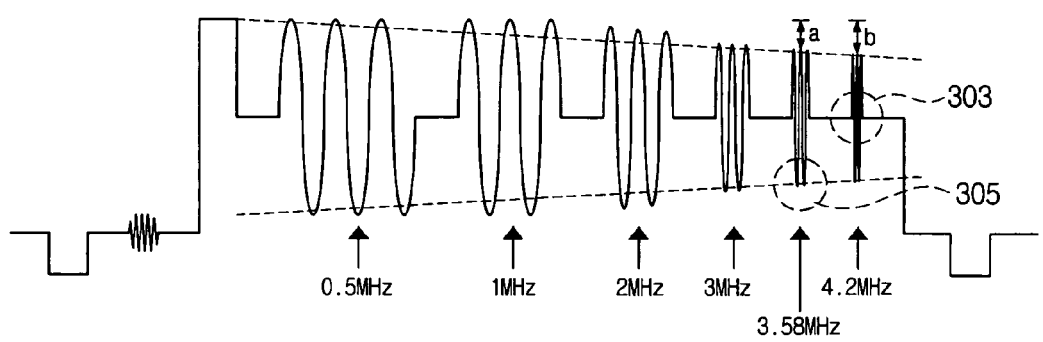

FIGS. 3A and 3B illustrate waveforms indicating a multi burst signal involved in a vertical blanking interval. Referring to a waveform illustrated in FIG. 3A, as in normal condition, the multi burst signal 301 includes 0.5, 1, 2, 3, 3.58, and 4.2 MHz signals, in which no distortion exists in the frequency characteristics. However, referring to a waveform in FIG. 3B, it is shown that the closer it approaches 3.58 and 4.2 MHz, the greater damp occurs. This illustrates that the characteristic of high frequency is distorted. A 3.58 MHz band signal 303 is damped by an amount 'a', and a 4.2 MHz band signal 305 is damped by an amount 'b'. The frequency characteristics of 3 MHz or less band are not an object of interest of the present invention. This is because the frequency band of the carrier chrominance signal is about 1 MHz band about a 3.58 MHz color subcarrier.

The frequency characteristic detecting section 201 compares the amplitude of 3.58 and 4.2 MHz bands that are the carrier chrominance signal band with a preset reference value, detecting the amounts 'a' and 'b'. To this end, using a band pass filter (BPF) (not shown) for 3.58 and 4.2 MHz frequencies, the 3.58 and 4.2 MHz frequency components are separated. The reference value may be set to an amplitude of the multi burst signal previously known upon the normal input. The frequency characteristic detecting section 201 outputs a difference value (hereinafter, referred to as 'b-a') in a dB unit value between b and a that are the respective damp values relative to the reference value. According to exemplary embodiments, the frequency characteristic detecting section 201 only detects the amounts a and b and transfers them to the correcting section 203, and the correcting section 203 may then calculate a value of b-a.

The correcting section 203 corrects the frequency characteristics of the carrier chrominance signal decomposed from the composite video signal.

Figure 1A:
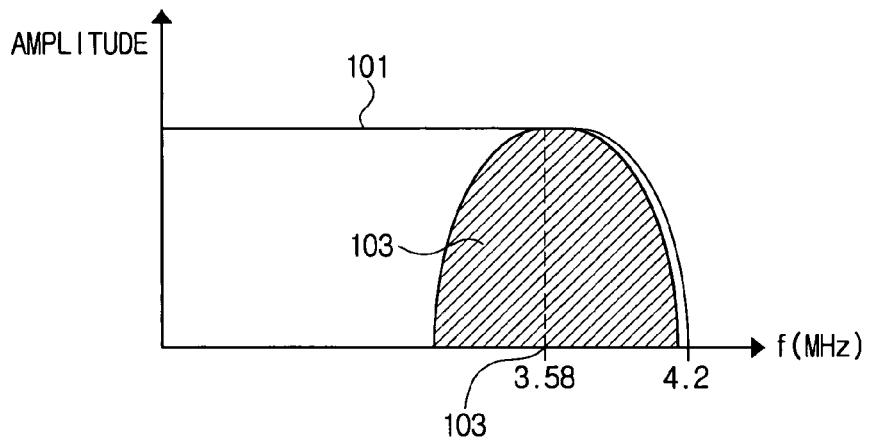
FIGS. 1A to 1C are graphs illustrating the frequency characteristics of the composite video signal in order to explain a problem of the prior art.
Figure 1B:
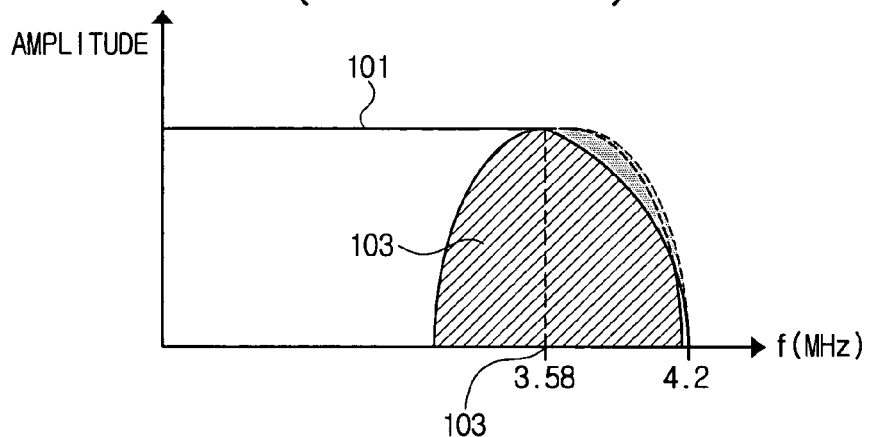
Figure 1C:
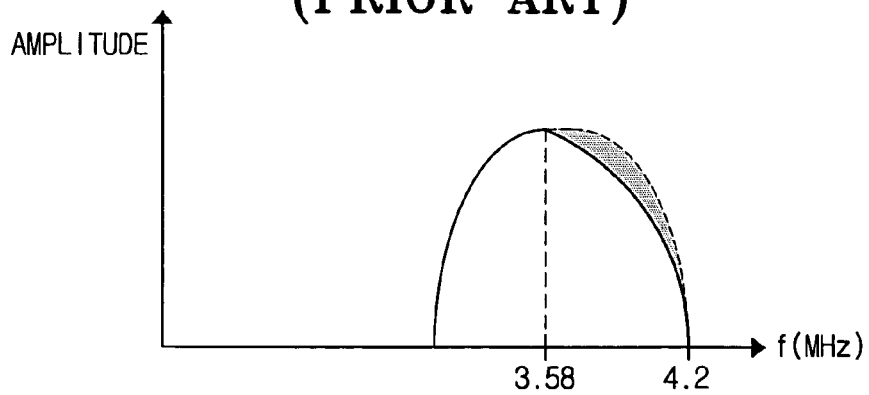

The carrier chrominance signal means a color signal intermediate-modulated into a 3.58 MHz color subcarrier frequency. A region 103 of FIG. 1A or the signal illustrated in FIG. 1C corresponds to that signal. In the case that the frequency characteristic is distorted like the graph of FIG. 1C, the correcting section 203 corrects the distorted frequency characteristic.

The correcting section can correct the more distorted 4.2 MHz band and the less distorted 3.58 MHz band to have the same distortion factor. And using an amplifier (not shown) installed in an end of the correcting apparatus of the present invention, the total damping state is uniformly corrected to thus restore an original carrier chrominance signal.

In order to correct the frequency characteristic of the carrier chrominance signal, the correcting section 203 can be implemented in an equalizer or other filter as a compensating circuit characterized by a transfer function in which linearly in 4.2 MHz, a gain takes b-a value, and in 3.58 MHz, a gain has 0 dB. In the case of filter, the frequency characteristic of the carrier chrominance signal can be corrected by using BPF that has a 4.2 MHz center frequency and a gain of b-a value transferred from the frequency characteristic detecting section 201. Preferably, but not necessarily, such BPF is designed to have 0 dB at a frequency of 3.58 MHz.

Figure 4:
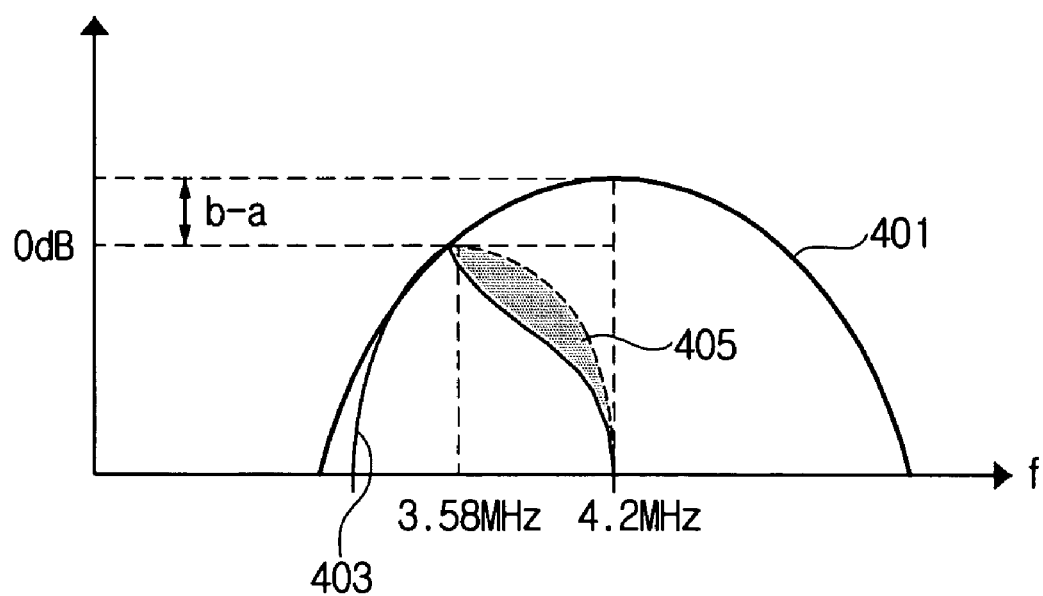
FIG. 4 is a graph explaining a correction-by-a compensating circuit of the frequency characteristics of a damped carrier chrominance signal in a correcting section 203 of FIG. 2.

FIG. 4 is a graph explaining a correction-by-a compensating circuit of the frequency characteristics of a damped carrier chrominance signal in a correcting section 203 of FIG. 2. Referring to a graph in FIG. 4, the compensating circuit has a transfer function that has a gain of b-a value in a frequency of 4.2 MHz and 0 dB in a frequency of 3.58 MHz.

The correcting section 203 corrects the damped frequency characteristic with the compensating circuit allowing the input carrier chrominance signal to be controlled by b-a output value of the frequency characteristic detecting section 201.

As described above, according to the present invention, in the case that the frequency characteristic of the carrier chrominance signal involved in the input composite video signal is distorted by the frequency characteristics and so on of the analog broadcasting radio channel and the broadcasting receiver, the distortion can be corrected. Accordingly, a stable reproduction of the color signal is possible irrespective of the broadcasting channels and the broadcasting receiver.

The foregoing exemplary embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. An apparatus for correcting frequency characteristics of a carrier chrominance signal, the apparatus comprising:
    a correcting section which corrects the frequency characteristics of the carrier chrominance signal decomposed from a composite video signal in which a correction signal is interleaved in a vertical blanking interval, using a gain; and
    a frequency characteristic detecting section which detects the frequency characteristics from the correcting signal decomposed from the composite video signal so as to control the gain of the correcting section.

2. The apparatus of claim 1, wherein the correcting section comprises a compensating circuit characterized by a transfer function in which the gain at a color subcarrier frequency of the carrier chrominance signal is 0 dB, and the gain is obtained at the highest frequency of the composite video signal.

3. The apparatus of claim 1, wherein the frequency characteristic detecting section transfers to the correcting section a damp difference, obtained from the frequency characteristics of the correcting signal and adapted as the gain, between a highest frequency of the composite video signal and a color subcarrier frequency component of the carrier chrominance signal.

4. The apparatus of claim 3, wherein the frequency characteristic detecting section transfers to the correcting section the damp difference in a dB unit value.

5. A video decoder comprising a apparatus for correcting frequency characteristics of a carrier chrominance signal, the apparatus comprising:
    a correcting section which corrects the frequency characteristics of the carrier chrominance signal decomposed from a composite video signal in which a correction signal is interleaved in a vertical blanking interval, using a gain; and
    a frequency characteristic detecting section which detects the frequency characteristics from the correcting signal decomposed from the composite video signal so as to control the gain of the correcting section,
    the video decoder outputting a color signal through the correction of the frequency characteristic of the carrier chrominance signal decomposed from the composite video signal.

6. A method for correcting frequency characteristics of a carrier chrominance signal, the method comprising:
    detecting the frequency characteristics from a correcting signal decomposed from a composite video signal in which the correcting signal is interleaved in a vertical blanking interval;
    calculating a gain to be corrected from the frequency characteristics which are detected; and
    correcting the frequency characteristics of the carrier chrominance signal decomposed from the composite video signal, using a compensating circuit with the gain which is calculated.

7. The method of claim 6, wherein the compensating circuit is characterized by a transfer function in which the gain at a color subcarrier frequency of the carrier chrominance signal is 0 dB, and the gain is obtained at a highest frequency of the composite video signal.

8. The method of claim 6, wherein in the calculating, the gain is provided as a damp difference, obtained from the frequency characteristics which are detected, between a highest frequency of the composite video signal and a color subcarrier frequency component of the carrier chrominance signal.

9. The method of claim 8, wherein in the calculating, the gain by the damp difference is calculated in a dB unit value.

* * * * *